US010276187B2

(12) United States Patent
Gross

(10) Patent No.: US 10,276,187 B2
(45) Date of Patent: Apr. 30, 2019

(54) VEHICLE AMBIENT AUDIO CLASSIFICATION VIA NEURAL NETWORK MACHINE LEARNING

(71) Applicant: Ford Global Technologies, LLC, Dearborn, MI (US)

(72) Inventor: Ethan Gross, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/298,077

(22) Filed: Oct. 19, 2016

(65) Prior Publication Data

US 2018/0108369 A1    Apr. 19, 2018

(51) Int. Cl.
*G10L 25/00* (2013.01)
*G10L 21/00* (2013.01)
(Continued)

(52) U.S. Cl.
CPC .......... *G10L 25/51* (2013.01); *B60R 25/1001* (2013.01); *B60R 25/1009* (2013.01); *B60R 25/302* (2013.01); *B60R 25/31* (2013.01); *G06N 3/0454* (2013.01); *G06N 3/08* (2013.01); *G06N 3/084* (2013.01); *G07C 9/00896* (2013.01);
(Continued)

(58) Field of Classification Search
CPC ......... G10L 25/51; G10L 25/24; G10L 25/30; B60R 25/1001; B60R 25/1009; B60R 25/302; B60R 25/31; B60R 21/01516; B60R 25/00; B60R 25/1004; G06N 3/0454; G06N 3/08; G07C 9/00896;
(Continued)

(56) References Cited

U.S. PATENT DOCUMENTS 5,576,972 A * 11/1996 Harrison ................. G01S 13/04
702/128
5,598,141 A * 1/1997 Grasmann ........... B60R 25/1004
340/426.27
(Continued)

FOREIGN PATENT DOCUMENTS

WO    WO 2008/055306         5/2008
WO    WO2015068033 A1        5/2015

OTHER PUBLICATIONS

DeepEar Robust Smartphone Audio Sensing in Unconstrained Acoustic Environments Using Deep Learning.
(Continued)

*Primary Examiner* — Michael Ortiz-Sanchez
(74) *Attorney, Agent, or Firm* — David R. Stevens; Stevens Law Group

(57) ABSTRACT

A method and an apparatus for detecting and classifying sounds around a vehicle via neural network machine learning are described. The method involves an audio recognition system that may determine the origin of the sounds being inside or outside of a vehicle and classify the sounds into different categories such as adult, child, or animal sounds. The audio recognition system may communicate with a plurality of sensors in and around the vehicle to obtain information of conditions of the vehicle. Based on information of the sounds and conditions of the vehicles, the audio recognition system may determine whether an occupant or the vehicle is at risk and send alert messages or issue warning signals.

16 Claims, 6 Drawing Sheets

(51) Int. Cl.

| | | |
|---|---|---|
| *B60R 25/00* | (2013.01) | |
| *G10L 25/51* | (2013.01) | |
| *B60R 25/10* | (2013.01) | |
| *B60R 25/30* | (2013.01) | |
| *B60R 25/31* | (2013.01) | |
| *G06N 3/04* | (2006.01) | |
| *G06N 3/08* | (2006.01) | |
| *G07C 9/00* | (2006.01) | |
| *G10L 25/30* | (2013.01) | |
| *G08B 21/00* | (2006.01) | |
| *G10L 25/24* | (2013.01) | |

(52) U.S. Cl.
CPC .............. *G08B 21/00* (2013.01); *G10L 25/30* (2013.01); *B60R 2025/1016* (2013.01); *G10L 25/24* (2013.01)

(58) Field of Classification Search
CPC .......... G06Q 30/0266; H04L 2209/805; H04L 2209/84; B60N 2/002
See application file for complete search history.

(56) References Cited

U.S. PATENT DOCUMENTS

| | | | |
|---|---|---|---|
| 5,680,096 A | 10/1997 | Grasmann | |
| 5,780,937 A * | 7/1998 | Kong | B60N 2/002 307/10.1 |
| 6,028,537 A * | 2/2000 | Suman | B60K 35/00 340/426.14 |
| 6,337,625 B1 * | 1/2002 | Taylor | B60R 25/1009 340/541 |
| 6,630,884 B1 * | 10/2003 | Shanmugham | G07C 5/0891 340/436 |
| 6,718,239 B2 * | 4/2004 | Rayner | B60R 1/00 340/541 |
| 7,353,088 B2 | 4/2008 | Eagen et al. | |
| 7,355,508 B2 * | 4/2008 | Mian | B60R 25/00 340/425.5 |
| 8,284,041 B2 | 10/2012 | Cuddihy et al. | |
| 8,847,750 B1 | 9/2014 | Malakuti | |
| 9,154,893 B1 | 10/2015 | Breed | |
| 9,275,136 B1 * | 3/2016 | Sharifi | G06F 17/30743 |
| 9,452,732 B1 * | 9/2016 | Hermann | B60R 25/10 |
| 2003/0233233 A1 * | 12/2003 | Hong | G10L 15/20 704/256.5 |
| 2005/0021224 A1 * | 1/2005 | Gray | B60H 1/00771 701/36 |
| 2006/0031066 A1 * | 2/2006 | Hetherington | G10L 21/0208 704/226 |
| 2006/0089753 A1 * | 4/2006 | Eagen | B60R 25/1004 701/1 |
| 2006/0192658 A1 * | 8/2006 | Yamamura | B60R 25/302 340/425.5 |
| 2008/0082323 A1 | 4/2008 | Bai et al. | |
| 2009/0046538 A1 * | 2/2009 | Breed | B60C 11/24 367/93 |
| 2009/0121850 A1 * | 5/2009 | Tanaka | B60R 25/102 340/426.24 |
| 2009/0273673 A1 * | 11/2009 | Worley, III | B60R 25/102 348/148 |
| 2011/0074565 A1 * | 3/2011 | Cuddihy | B60N 2/002 340/457 |
| 2011/0112836 A1 * | 5/2011 | Kurki-Suonio | G10L 15/30 704/235 |
| 2011/0281562 A1 * | 11/2011 | Videtich | H04W 4/046 455/414.1 |
| 2012/0004933 A1 * | 1/2012 | Foladare | G06Q 40/00 705/4 |
| 2012/0050021 A1 | 3/2012 | Rao et al. | |
| 2013/0033381 A1 * | 2/2013 | Breed | B60T 1/005 340/568.1 |
| 2013/0049946 A1 * | 2/2013 | Chavez | B60Q 1/00 340/457 |
| 2016/0272113 A1 | 9/2016 | Lopez | |
| 2016/0297324 A1 * | 10/2016 | Taylor | B60N 2/002 |
| 2017/0197583 A1 * | 7/2017 | Izraeli | B60R 25/102 |
| 2017/0236051 A1 * | 8/2017 | van der Made | G06N 3/049 706/27 |
| 2017/0263126 A1 * | 9/2017 | Kim | G08G 1/163 |
| 2017/0323653 A1 * | 11/2017 | Hassan al Banna | G10L 15/20 |

OTHER PUBLICATIONS

"Mel-frequency cepstrum", dated Aug. 2016, https://web.archive.org/web/20160817175128/https://en.wikipedia.org/wiki/Mel-frequency_cepstrum (Wikipedia).

http://practicalcryptography.com/miscellaneous/machine-learning/guide-mel-frequency-cepstral-coefficients-mfccs/.

https://www.quora.com/Is-it-possible-to-use-a-machinelearning-algorithm-to-determine-whether-or-not-a-voice-comes-from-person-I-or-person-2.

* cited by examiner

VEHICLE AMBIENT AUDIO CLASSIFICATION VIA NEURAL NETWORK MACHINE LEARNING

TECHNICAL FIELD

The present disclosure generally relates to sound detection and classification with respect to an automotive vehicle and, more particularly, to classification of sounds via neural network machine learning.

BACKGROUND

The safety of occupant(s) inside a moving automotive vehicle is an important consideration in the decision of purchasing an automotive vehicle. There are many technological advances and innovations towards protection for occupant(s) inside a moving automotive vehicle in the event of an accident or in the forms of preventive measures. The safety of occupant(s) inside a parked vehicle imparts a distinctive challenge to the intelligence of a safety system, especially when a young occupant is left alone inside. Parents may be unaware of the danger of leaving an infant, a toddler, or a kindergarten child in an unattended vehicle. The temperature inside a vehicle may rise significantly in a short amount of time in a hot day and the body temperature of a child may rise much faster than an adult. The safety for young occupant(s) may be improved if a safety system in a vehicle has the intelligence to recognize that the occupant is young and the vehicle is in a state that could cause harm to the young occupant, and the safety system proactively issues warning signals or notifies the owner of the vehicle when such a situation occurs.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure describes an audio recognition system installed in a vehicle that may determine the origin of sounds inside or outside of a vehicle, and carry out responsive actions based on the classification of the sounds and conditions of the vehicle.

In various embodiments in accordance with the present disclosure, an audio recognition system may determine the origin of sounds around a vehicle (e.g., whether from inside or outside of the vehicle) and classify the sounds via neural network machine learning. The audio recognition system may communicate with vehicle sensors to obtain conditions of the vehicle. Based on the sounds and conditions of the vehicle, the audio recognition system may determine whether to send alert messages or provide warning signals (e.g., flashing warning lights and/or honking horns).

Figure 1:
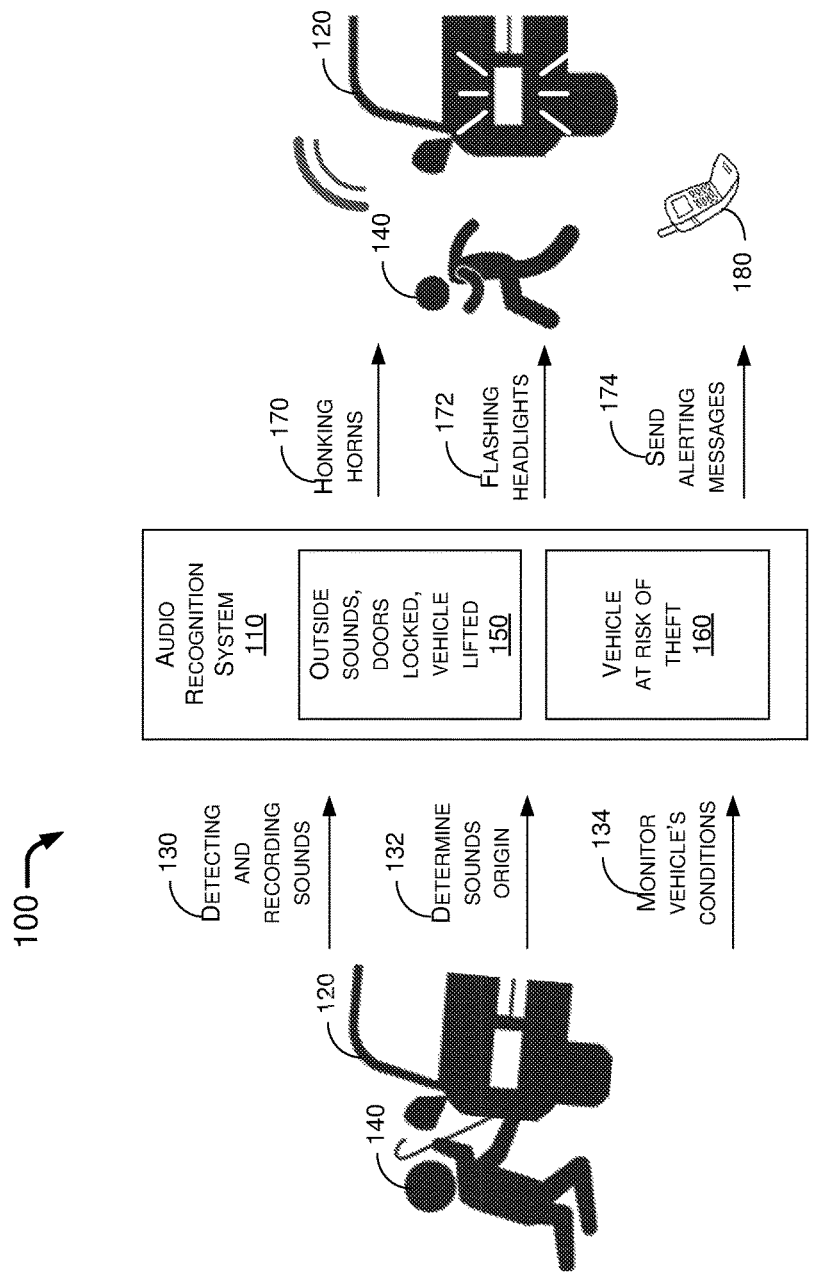
FIG. 1 is a diagram depicting an example scenario in which an audio recognition system in accordance with the present disclosure may be utilized.

FIG. 1 illustrates an example scenario 100 in which an audio recognition system 110 in accordance with the present disclosure may be utilized. Scenario 100 is an illustrative example of how audio recognition system 110 of the present disclosure may be used in alerting owners of vehicle 120 and bystanders when vehicle 120 is determined to be at risk of vandalism or theft. Audio recognition system 110 may detect and record sounds (e.g., sounds of machinery) around vehicle 120. Audio recognition system 110 may also be trained using machine learning neural networks, and thus may be able to determine that the origin of sounds as to whether the sounds is from inside or outside of vehicle 120. The audio recognition system 110 may have sensors in and around vehicle 120 to monitor conditions of vehicle 120. Based on information of the sounds (inside or outside vehicle 120) and conditions of vehicle 120, audio recognition system 110 may determine whether vehicle 120 is at risk of vandalism or theft.

Shown in FIG. 1 as an illustrated example, a thief 140 outside of vehicle 120 is trying to jack up vehicle 120 and to steal wheels of vehicle 120. The sounds of operating a jack may be detected and recorded by audio recognition system 110, as indicated by numeral reference 130. The audio recognition system may further determine the sounds of operating a jack is originated from outside of vehicle 120, as indicated by numeral reference 132. Conditions of vehicle 120 may be monitored by sensors in and around vehicle 120, as indicated by numeral reference 134. The sensors capable of sensing an angle of inclination (such as Viper™ 507M tilt motion sensor) may detect that vehicle 120 is being lifted while the doors are locked. The audio recognition system 110 processes information obtained from 130, 132, and 134, as indicated by block 150 in FIG. 1, via neural network machine learning. Based on information of block 150 (e.g., vehicle 120 being tilted or otherwise moved in one way or another, doors being locked, and sounds outside vehicle 120), audio recognition system 110 may determine that vehicle 120 is at risk of theft, as indicated by block 160. Correspondingly, audio recognition system 110 may proceed with or otherwise cause sending of alert messages (numeral reference 174) to a cell phone 180 of the owner of vehicle 120 (or equivalent devices) and activation of warning signals. The warning signals may be a combination of flashing headlights (numeral reference 172) and honking horns (numeral reference 170). The flashing headlights 172 and honking horns 170 may catch the attention of bystanders to check out vehicle 120 or cause thief 140 to stop the theft and/or run away.

As another example, audio recognition system 110 may learn that vehicle 120 is in motion with random sounds detected from outside of vehicle 120. Vehicle 120 may be parked along a roadside on a hill and with a hand brake deployed. In the event of a hand brake failure, vehicle 120 may slide down to lower sections of the street. Similar to example scenario 100, audio recognition system 110 may, based on information of the sounds (outside sounds indicating no occupant) and conditions of vehicle 120 (in motion with doors locked and no key inserted in the ignition keyhole), determine that vehicle 120 is at risk and send corresponding alert messages and/or warning signals (e.g., in a combination of flashing headlights and honking horns) to prevent injury of bystanders.

Figure 2:
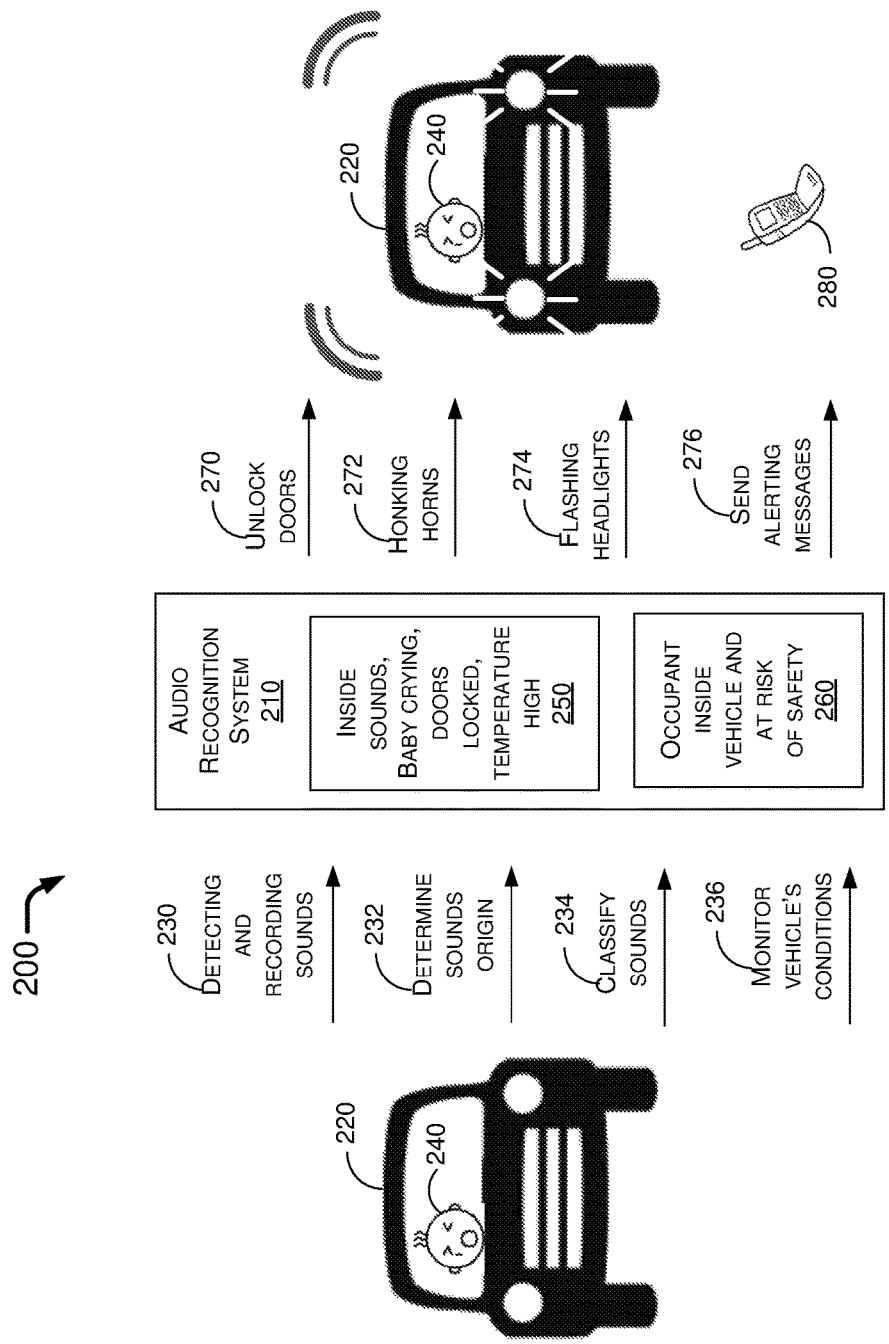
FIG. 2 is a diagram depicting another example scenario in which an audio recognition system in accordance with the present disclosure may be utilized.

FIG. 2 illustrates another example scenario 200 in which an audio recognition system 210 in accordance with the present disclosure may be utilized. Scenario 200 is an illustrative example of how audio recognition system 210 of the present disclosure may be used in alerting owners of vehicle 220 and bystanders when an occupant inside vehicle 220 is determined to be at risk of danger. Audio recognition system 210 may detect and record sounds (e.g., sounds of a baby or an animal) in vehicle 220. Audio recognition system 210 may also be trained using machine learning neural networks, and thus may be able to determine that the origin of sounds as to whether the sounds is from inside or outside of vehicle 220 and recognize the sounds into classified categories. The categories may include, for example and without limitation, sounds of an adult, a child and an animal. The audio recognition system 210 may have sensors in and around vehicle 220 to monitor conditions of vehicle 220. Based on information of the sounds (inside or outside vehicle 220, and sounds category) and conditions of vehicle 220, audio recognition system 210 may determine whether there is an occupant inside vehicle 220 and whether the occupant, if determined to be inside vehicle 220, is at risk of danger.

FIG. 2 illustrates what may happen as audio recognition system 210 determines that a young occupant 240 may be left alone inside vehicle 220 in accordance with embodiments of the present disclosure. A young occupant 240 (e.g., a baby), when left alone in closed vehicle 220, may suffer from high temperature and make uncomfortable sounds e.g., by crying. The sounds of the baby crying may be detected and recorded by audio recognition system 210, as indicated by numeral reference 230. Audio recognition system 210 may first determine that the sounds originate from inside of vehicle 220 (numeral reference 232), and may classify the sounds as "a baby or a child" (numeral reference 234). At this point, audio recognition system 210 may determine that an occupant 240 may be inside vehicle 220. The audio recognition system 210 may have sensors in and around vehicle 220 to monitor conditions of vehicle 220, as indicated by numeral reference 236. The audio recognition system 210 processes information obtained from 230, 232, 234, and 236, as indicated by block 250 in FIG. 1, via neural network machine learning. Combining with information received from built-in sensors such as a temperature inside vehicle 220 and doors being locked, audio recognition system 210 may determine that occupant 240 may be in danger, as indicated by block 260. A series of actions including sending alert messages (numeral reference 276) to a cell phone 280 of the owner of vehicle 220 (or equivalent devices) and/or warning signals (e.g., a combination of flashing headlights, as indicated by numeral reference 274 and honking horns, as indicated by numeral reference 272) may be performed by audio recognition system 210 once it determines that occupant 240 may be at risk of danger. Audio recognition system 210 may proceed further to unlock doors (numeral reference 270) of vehicle 220 to increase survival chance of occupant 240. Bystanders near vehicle 220 may notice warning signals of flashing headlights 274 and/or honking horns 272, and may recuse occupant 240 easily without breaking windows which may demand a great deal of physical strength or proper tools to gain access into vehicle 220.

As an alternative example of scenario 200, a cat (or other animal) may be left alone inside vehicle 220. Audio recognition system 210 may determine the sounds of the cat being originated from inside of vehicle 220. Audio recognition system 210 may further categorize the sounds being "sounds of an animal". Conditions of vehicle 220 may be monitored by sensors and transmitted to audio recognition system 210. Once the conditions of vehicle 220 reach a dangerous level such as a high temperature over 100 degree Fahrenheit for the cat, audio recognition system 210 may determine that the cat is at risk of danger and may carry out a series of actions similar to those mentioned above in an effort to rescue the cat.

As electronic devices powered by lithium-ion batteries are increasingly common in recent years, charging a lithium-ion battery inside a vehicle may be unavoidable for travelers. In some situations, lithium-ion batteries can explode during charging, so charging a lithium-ion battery inside a vehicle may be a danger of catching fire after the explosion of battery. In some embodiments, audio recognition system 210 may be utilized to mitigate the extent of damages in the event of battery explosion. The sounds of explosion may be detected as being inside of vehicle 220 and categorized as "bang or blast". Immediate actions similar to those mentioned above may be taken by audio recognition system 210 to alert an owner of vehicle 220, regardless of vehicle conditions. Ensuing damage in the event of fire breakout may be contained if the owner of vehicle 220 returns to vehicle 220 in time to put out the fire.

Figure 3:
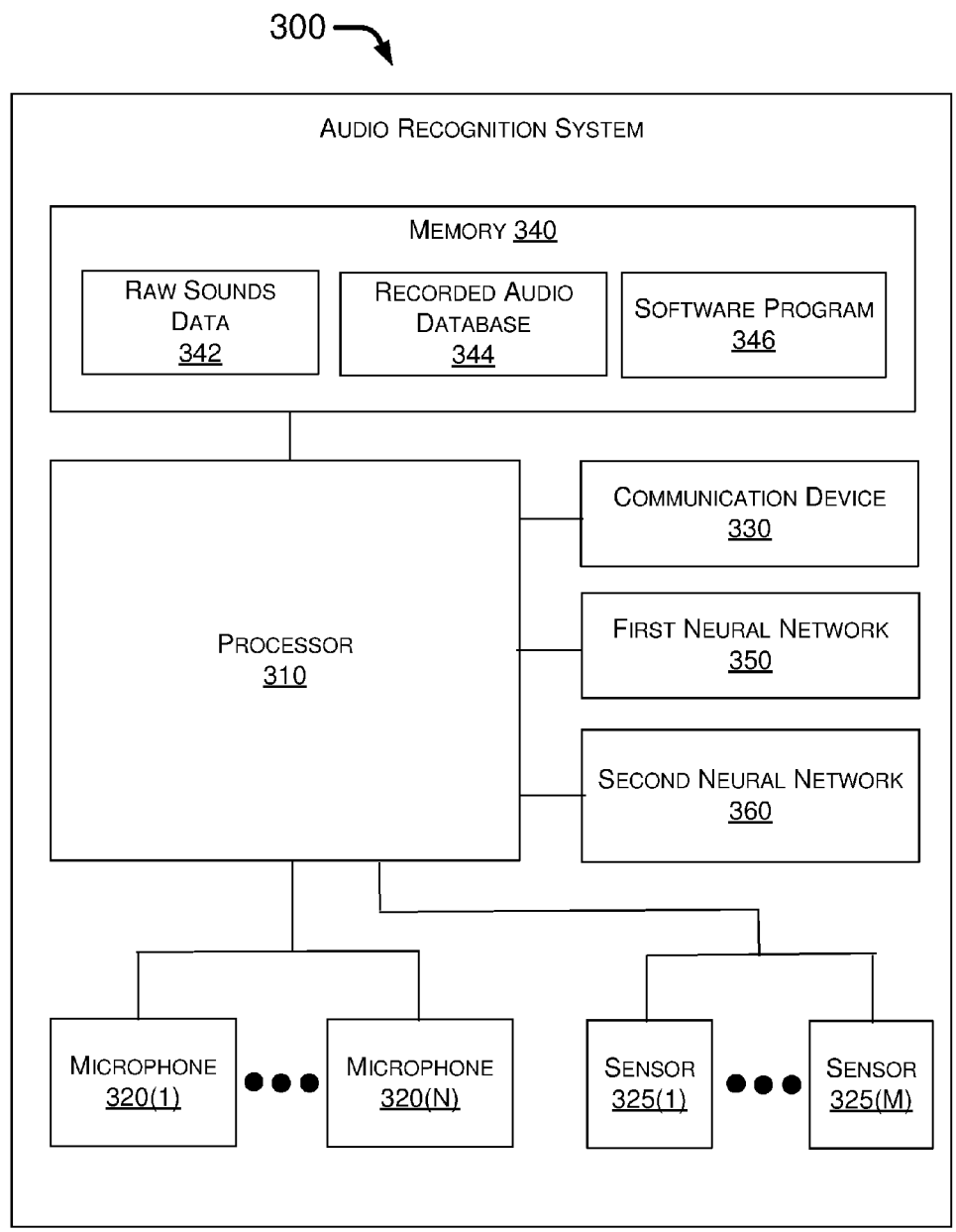
FIG. 3 is a block diagram depicting an example apparatus of an audio recognition system in accordance with an embodiment of the present disclosure.

FIG. 3 illustrates an example apparatus of an audio recognition system 300 in accordance with an embodiment of the present disclosure. Audio recognition system 300 may perform various functions related to techniques, methods and systems described herein, including those described above with respect to scenario 100 and scenario 200 as well as those described below with respect to processes 400, 500, and 600. Audio recognition system 300 may be installed in, equipped on, connected to or otherwise implemented in an automotive vehicle 120 in scenario 100 and automotive vehicle 220 in scenario 200 to effect various embodiments in accordance with the present disclosure. Thus, audio recognition system 300 may be an example implementation of each of audio recognition system 110 and audio recognition system 210. Audio recognition system 300 may include at least some of the components illustrated in FIG. 3.

In some embodiments, audio recognition system 300 may include at least one microphone. For illustrative purpose and without limitation, the at least one microphone is shown in FIG. 3 as one or more microphones 320(1)-320(N), with N being a positive integer greater than or equal to 1. The one or more microphones 320(1)-320(N) may include amplifiers to increase signal-to-noise ratios of detected sounds. Each of the one or more microphones 320(1)-320(N) may be mounted on or embedded in different locations of a vehicle.

In some embodiments, at least one of the one or more microphones 320(1)-320(N) may be mounted on or embedded in location(s) inside the vehicle. In some embodiments, at least of the one or more microphones 320(1)-320(N) may be mounted on or embedded in location(s) outside the vehicle.

In some embodiments, audio recognition system 300 may include a communication device 330. Communication device 330 may be configured to receive data from and/or transmit instructions to one or more components inside the vehicle. Communication device 330 may be configured to communicate wirelessly and/or via wire(s) in accordance with any suitable wireless and/or wired standards, specifications and/or protocols.

In some embodiments, audio recognition system 300 may include a memory device 340 configured to store raw data 342 of sounds, a database 344 of various types of audio files, and one or more software programs 346 therein. For example, memory device 340 may store a software program configured to convert recorded and/or live sounds into audio files.

In some embodiments, audio recognition system 300 may include a processor 310 communicatively coupled to process sound data received from the one or more microphones 320(1)-320(N). Processor 310 may also be coupled to memory device 340 to access data stored therein and to execute any firmware and/or software programs stored therein. Processor 310 may be configured to store in memory 340 as raw data 342 of sounds the sound data received from the one or more microphones 320(1)-320(N). In some embodiments, Audacity™ may be used in connection with Ford Sync™ microphones of Ford Motor Company to record the sounds into audio files. The audio files may be processed by processor 310 to calculate Mel-frequency cepstrum coefficients. Processor 310 may determine the origin of each sound as being originated from inside or outside of a vehicle and classify the sounds into different categories based on neural network learning. The categories may include, for example and without limitation, at least adult, child, and animal sounds.

In some embodiments, audio recognition system 300 may include at least one sensor. For illustrative purpose and without limitation, the at least one sensor is shown in FIG. 3 as one or more sensors 325(1)-325(M), with M being a positive integer greater than or equal to 1. Each of the one or more sensors 325(1)-325(M) may be built in, mounted on or otherwise embedded in a vehicle to monitor a respective condition or parameter with respect to the vehicle. For example, the one or more sensors 325(1)-325(M) may be configured to monitor conditions such as, for example and without limitation, whether a key is or is not inserted in an ignition keyhole, whether a key is or is not inside the vehicle, whether the vehicle is lifted, whether the vehicle is in motion, whether one or more of the doors of the vehicle is/are locked or unlocked, and a temperature inside the vehicle reaching or exceeding a threshold temperature.

In some embodiments, processor 310 may be configured to receive conditions of the vehicle from the one or more sensors 325(1)-325(M) directly and/or via communication device 330. The conditions of the vehicle, for illustrative purpose and without limitation, may include a key not being inserted in the ignition keyhole, a key not being inside the vehicle, the vehicle being lifted, the vehicle being in motion, all doors being locked, and a temperature inside a vehicle reaching or exceeding the threshold temperature. Processor 310 may determine whether the occupant(s) or the vehicle is at risk of danger or theft, and may provide one or more instructions via communication device 330 to one or more components of the vehicle for execution of the instructions. The one or more components of the vehicle may perform actions according to the instructions. The actions may include, for example and without limitation, sending one or more alert message to phones of owner(s) of the vehicle, flashing headlights, honking horns, unlocking doors, or a combination of two or more of the aforementioned actions.

In some embodiments, audio recognition system 300 may include a first neural network 350 and a second neural network 360. First neural network 350 may be trained with a set of sounds played either inside or outside of a vehicle in a human-hearing perceivable range, roughly 20-20,000 Hertz. As some of frequencies of sounds played outside of the vehicle may be blocked by structures of the vehicle (e.g., doors, windows, windshield and car body), sounds played inside the vehicle may produce different Mel-frequency cepstrum coefficients (amplitudes of a resultant spectrum after a Direct Cosine Transform of a power spectrum of a sound, details provided in the process 500 section) than sounds played outside the vehicle. Second neural network 360 may be trained with a number of sets of sounds in different categories, which may include at least adult, child, and animal sounds. In some embodiments, the categories may include sounds as described in example scenario 100 and example scenario 200 concerning safety of occupant(s) or vehicle such as baby crying and battery explosion. First neural network 350 and second neural network 360 may include one input layer, at least one hidden layer, and one output layer. The hidden layer receives data from a previous layer (e.g. input layer) and modifies the data before sending them to the next layer (e.g. output layer). The hidden layer is comprised of nodes (or neurons) with weight factors associated with each input and a bias factor of each node. By properly adjusting the weight factors and the bias factor of each node in the hidden layer throughout the learning cycle, the neural network may be trained to report the right output (yes or no) for a given type of input. The hidden layer may include different numbers of nodes (or neurons) depending on the complexity of tasks. Second neural network 360 may include more nodes the first neural network 350 in the hidden layer due to the greater complexity of classifying sounds compared to determination of whether a given sound is played or otherwise originated from inside or outside a vehicle. In some embodiments, pattern recognition tool "nrptool" of MATLAB™ may be used to build neural networks such as first neural network 350 and second neural network 360. In some embodiments, first neural network 350 may have multiple nodes (e.g., 10 nodes or 20 nodes) in the hidden layer, and second neural network 360 may have more nodes (e.g., 100 nodes) in the hidden layer to achieve a comparable learning period with first neural network 350 (since the task of classifying sounds may be more complicated than determining the origin of sounds and, thus, more nodes may help speeding up convergence of learning process).

Figure 4:
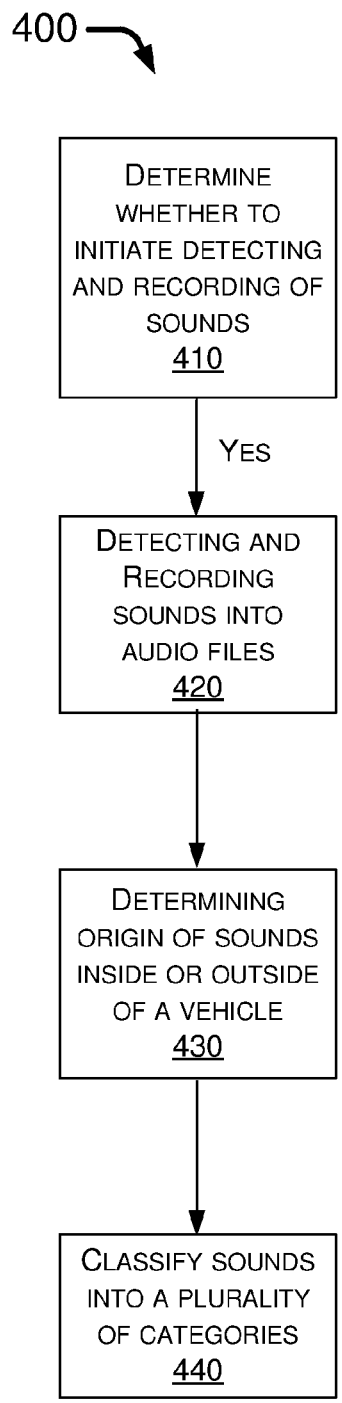
FIG. 4 is a flowchart depicting an example process of detecting and classifying sounds inside or outside of a vehicle in accordance with an embodiment of the present disclosure.

FIG. 4 illustrates an example process 400 in accordance with the present disclosure. Process 400 may be utilized to train neural networks to achieve sound classification and recognition in accordance with the present disclosure. Process 400 may include one or more operations, actions, or functions shown as blocks such as 410, 420, 430, and 440. Although illustrated as discrete blocks, various blocks of process 400 may be divided into additional blocks, combined into fewer blocks, or eliminated, depending on the desired implementation, and may be performed or otherwise carried out in an order different from that shown in FIG. 4.

Process 400 may be implemented in scenario 100 and/or scenario 200, and may be implemented by audio recognition system 300. For illustrative purposes and without limiting the scope of process 400, the following description of process 400 is provided in the context of scenario 200 as being implemented by audio recognition system 300. Process 400 may begin with block 410.

At 410, process 400 may involve processor 310 of audio recognition system 300 obtaining conditions of vehicle 220 as to whether to initiate a sound recording process. The sound recording process may be initiated by processor 310 as the conditions of vehicle 220 warrant a need to record sounds, which may be defined by audio recognition system 300. The audio recognition system 300 monitors conditions of vehicle 220 via one or more sensors 325(1)-325(M) in and around vehicle 220 and may begin the sound detecting and recording process once the conditions of the vehicle 220 are met, e.g., a key not inserted in ignition keyhole and doors locked. Process 400 may proceed from 410 to 420.

At 420, process 400 may involve processor 310 and software programs 346 recording sounds received from the one or more microphones 320(1)-320(N) into audio files. The locations of the one or more microphones 320(1)-320(N) may be distributed in and around the vehicle 220. A set of different sounds may be provided for training, validation, and testing purposes of neural network learning of first neural network 350 and/or second neural network 360. In some embodiments, the set of different sounds may involve a speaker playing with a frequency range 20-20K Hertz from inside or outside of vehicle 220. In another embodiment, the set of sounds may include adult talking, child laughing or crying, dog barking or cat meowing. The audio files recorded from different sounds may reside in audio database 344 in memory 340 for further processing. Process 400 may proceed from 420 to 430.

At 430, process 400 may involve processor 310 and first neural network 350 determining whether each of the recorded sounds is from inside or outside of vehicle 220. A speaker playing with a frequency range 20-20K Hertz from inside or outside of vehicle 220 may be provided as a training set of sounds for the first neural network 350. Processor 310 may perform Fourier Transformation on the set of audio files and calculate Mel-frequency cepstrum coefficients respectively as inputs to first neural network 350. A predetermined percentage of audio files may be allocated for training, validation, and testing, respectively. In some embodiments, the percentage of audio files for training, validation, and testing may be 70%, 15%, and 15%, respectively. First neural network 350 may be trained by taking Mel-frequency cepstrum coefficients as inputs and adjusting weight and bias factors of each node to obtain designated outputs. The interference phenomena between outside sounds and dimensions of vehicle 220 may result in certain frequency missing in the spectrum of outside sounds and may yield different Mel-frequency cepstrum coefficients compared with inside sounds even when both inside/outside sounds are from the same source. The amplitude of outside sounds may further be dampened by the vehicle itself. In some embodiments, first neural network 350 may include multiple nodes (e.g., 10 nodes or 20 nodes) and may adjust weight and bias factors according to a back-propagation algorithm. First network neural network 350, configured as described above, may achieve an accuracy with a mean square error less than 0.2% on the determination of sounds origination (inside or outside of vehicle 220). Process 400 may proceed from 430 to 440.

At 440, process 400 may involve processor 310 and second neural network 360 classifying the recorded sounds into a number of categories. Different sets of sounds including adult talking, child laughing or crying, dog barking or cat meowing, as well as other man-made and/or natural sounds, may be provided as training sets of sounds for the second neural network 360. Processor 310 may perform Fourier Transformation on the set of audio files and calculate Mel-frequency cepstrum coefficients respectively as inputs to second neural network 360. A predetermined percentage of audio files may be allocated for training, validation, and testing respectively. In some embodiments, the percentage of audio files for training, validation, and testing is 40%, 30%, and 30%, respectively. Second neural network 360 may take Mel-frequency cepstrum coefficients as inputs and adjust weight and bias factors of each node to obtain designated outputs. In some embodiments, second neural network 360 may include multiple nodes (e.g., 100 nodes) and may adjust weight and bias factors according to a back-propagation algorithm. Second network neural network 360, configured as described above, may achieve an accuracy with a mean square error less than 0.2% on the classification of sounds categories (adult, child, or animal sounds).

Figure 5:
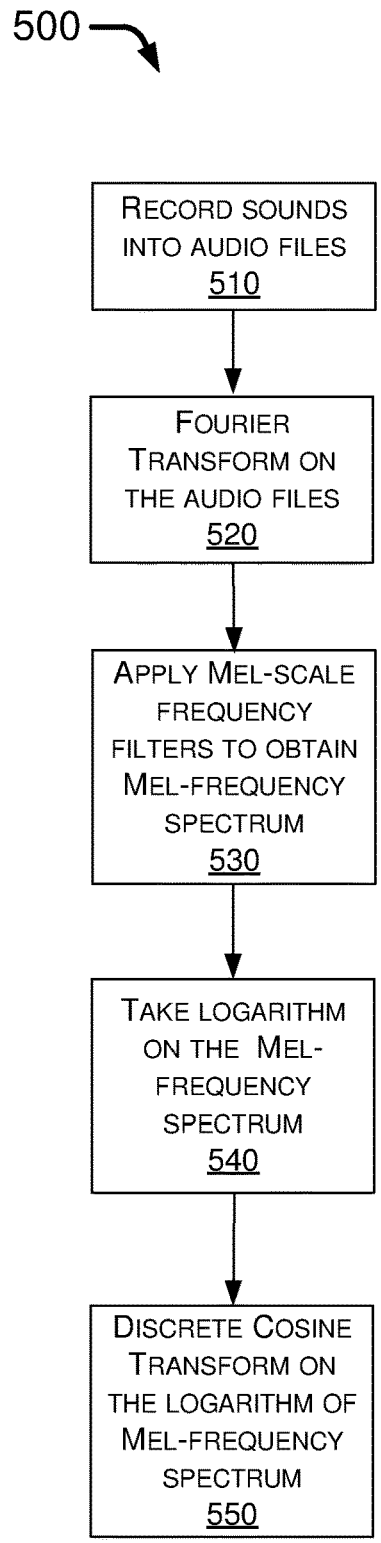
FIG. 5 is a flowchart depicting an example process of calculating Mel-frequency cepstrum coefficients in accordance with an embodiment of the present disclosure.

FIG. 5 illustrates an example process 500 of calculating Mel-frequency cepstrum coefficients in accordance with the present disclosure. Process 500 may be utilized to transfer characteristics of audio files as inputs to the neural network for machine learning purposes. Process 500 may include one or more operations, actions, or functions shown as blocks such as 510, 520, 530, 540, and 550. Although illustrated as discrete blocks, various blocks of process 500 may be divided into additional blocks, combined into fewer blocks, or eliminated, depending on the desired implementation, and may be performed or otherwise carried out in an order different from that shown in FIG. 5. Process 500 may be implemented in scenario 100 and/or scenario 200 and by processor 310. For illustrative purposes and without limiting the scope of process 500, the following description of process 500 is provided in the context of scenario 200 as being implemented by processor 310 of audio recognition system 300. Process 500 may begin with block 510.

At 510, process 500 may involve processor 310 recording sounds into audio files for further processing. Each of audio files may include segments of sounds that may be representative of a conversation, a construction background, a baby crying, an animal sounds, cars passing by, or airplanes flying over. The audio files may be viewed as amplitudes varying in time mathematically. Process 500 may proceed from 510 to 520.

At 520, process 500 may involve processor 310 transforming the audio files from amplitude varying in time to amplitude varying in frequency. In mathematical language, a Fourier Transform may be performed by processor 310 on recorded audio files. Process 500 may proceed from 520 to 530.

At 530, process 500 may involve processor 310 applying a bank of Mel-filters on Fourier-transformed audio files and converting horizontal linear frequency axis to a Mel scale. The Mel scale is a perceptual scale of pitches judged by listeners to be equal in distance from one another. The Mel scale more closely represents human hearing when compared with the linear scale since human hearing resolves sounds non-linearly. In some embodiments, thirteen Mel filters may be used for filtering. Each Mel filter may be triangular-shaped and center-peaked at a different Mel frequency. The resulting spectrum after Mel filtration may be referred as Mel-frequency spectrum. Process 500 may proceed from 530 to 540.

At 540, process 500 may involve processor 310 performing a logarithmic operation on Mel frequency spectrum. Process 500 may proceed from 540 to 550.

At 550, process 500 may involve processor 310 applying a Discrete Cosine Transformation on the logarithm of Mel-frequency spectrum. The result of Discrete Cosine Transformation is a set of Mel-frequency cepstrum coefficients related to the number of Mel filters used. In some embodiments, thirteen Mel-frequency cepstrum coefficients may be obtained as a result of process 500.

Figure 6:
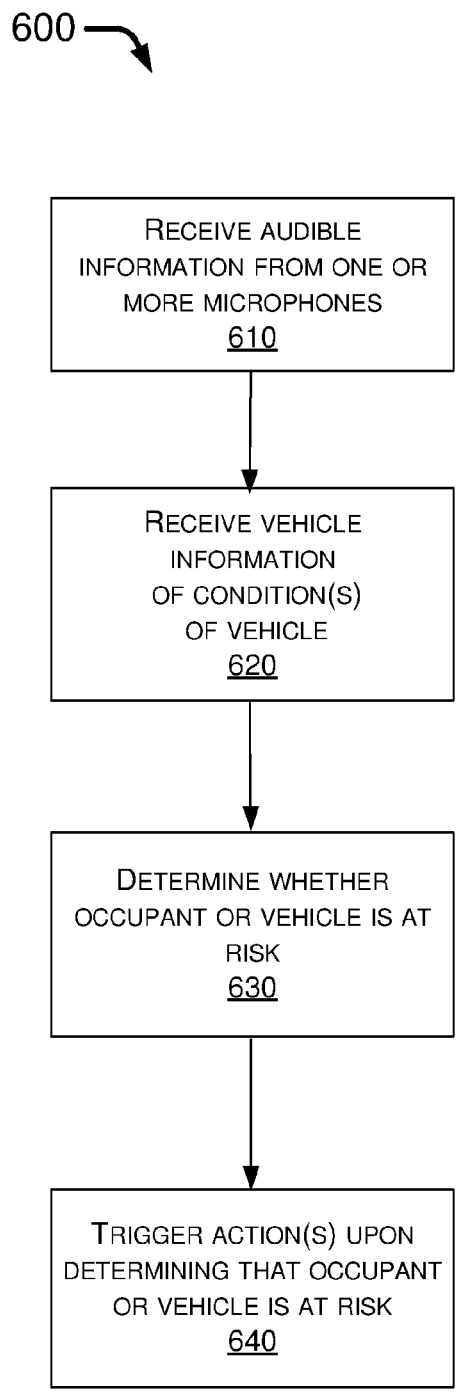
FIG. 6 is a flowchart depicting an example process of determining whether an occupant or a vehicle is at risk in accordance with an embodiment of the present disclosure.

FIG. 6 illustrates an example process 600 of determining whether an occupant or a vehicle is at risk in accordance with the present disclosure. Process 600 may include one or more operations, actions, or functions shown as blocks such as 610, 620, 630, and 640. Although illustrated as discrete blocks, various blocks of process 600 may be divided into additional blocks, combined into fewer blocks, or eliminated, depending on the desired implementation, and may be performed or otherwise carried out in an order different from that shown in FIG. 6. Process 600 may be implemented in scenario 100 and/or scenario 200 and by processor 310. For illustrative purposes and without limiting the scope of process 600, the following description of process 600 may be provided in the context of scenario 200 as being implemented by audio recognition system 300. Process 600 may begin with block 610.

At 610, process 600 may involve processor 310 receiving audible information from the one or more microphones 320(1)-320(N). Moreover, process 600 may also involve first neural network 350 and second neural network 360 determining whether an occupant is inside of vehicle 220 based on sound(s) received from the one or more microphones 320(1)-320(N). First neural network 350 may determine whether a sound is from inside or outside of vehicle 220. Second neural network 360 may classify whether the sound belongs to an adult, a child, or an animal. If the sound is determined by first neural network 350 to be from inside of a vehicle and categorized as an adult sound, a child sound, or an animal sound by second neural network 360, then audio recognition system 300 may determine that an occupant (whether human or animal) may be inside vehicle 220. Process 600 may proceed from 610 to 620.

At 620, process 600 may involve processor 310 receiving vehicle information of one or more conditions of vehicle 220 from one or more sensors 325(1)-325(M), e.g., via communication device 330. In some embodiments, the conditions of vehicle 220 may include, for example and without limitation, a key not being inserted in an ignition keyhole, a key not being inside of vehicle 220, vehicle 220 being lifted, vehicle 220 being in motion, doors of vehicle 220 being locked, or a temperature inside vehicle 220 reaching or exceeding a threshold temperature. The conditions of vehicle 220 listed herein are for illustrative purposes and should not be deemed as limiting the scope of the present disclosure. Process 600 may proceed from 620 to 630.

At 630, process 600 may involve processor 310 determining whether an occupant of vehicle 220 is at risk of danger or whether vehicle 220 is at risk of theft. A combination of conditions of vehicle 220 and information from first and second neural networks 350 and 360 may be sufficient for determining whether an occupant inside vehicle 220 is at risk of danger. For example, an occupant crying (inside sounds determined by first neural network 350 and crying identified as child sounds by second neural network 360) inside vehicle 220 with a temperature higher than 100 degree Fahrenheit may be a situation that places the occupant in a status of being in danger. As another example, a loud bang from inside of vehicle 220 may indicate a battery explosion of an electronic device and a fire hazard for vehicle 220. Process 600 may proceed from 630 to 640.

At 640, process 600 may involve processor 310 triggering one or more actions upon determining that the occupant or vehicle 220 is at risk. In some embodiments, processor 310 may, via communication device 330, provide instructions to one or more components of vehicle 220 to execute a series of responsive actions. For example, a series of alert message may be sent to owner(s) of vehicle 220 via a wirelessly transmittable component once an occupant is identified to be at risk of danger. Whether to call 911 may be decided by owner(s) of vehicle 220, depending on his/her proximity relative to the location of vehicle 220. Flashing headlights and honking horns may be deployed to catch attentions of bystanders. Processor 310 may further issue instructions to unlock doors of the vehicle for increasing chance of survival of the occupant.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
   receiving audible information from one or more microphones;
   receiving vehicle information of one or more conditions of a vehicle from one or more sensors;
   determining whether the vehicle is at risk of theft or whether an occupant of the vehicle is at risk of danger based on the vehicle information and the audible information by:
      determining that the vehicle is at risk of theft responsive to the audible information indicating a sound from outside the vehicle and the vehicle information indicating that the vehicle is tilted or moved, doors of the vehicle are locked with no occupant inside, and a key of the vehicle is not inside the vehicle; and
      determining that the occupant is at risk of danger responsive to the audible information indicating that the occupant is inside the vehicle and the vehicle information indicating that the doors of the vehicle are locked and a temperature inside the vehicle exceeds a threshold temperature; and
   performing some or all actions of a plurality of actions upon determining that the occupant or the vehicle is at risk, the plurality of actions comprising:
      wirelessly transmitting alert messages to a wireless receiver;
      activating headlights of the vehicle to flash the headlights;
      activating a horn of the vehicle to honk the horn; and
      controlling locks on the doors to unlock the doors.

2. The method of claim 1, wherein the receiving of the audible information from the one or more microphones comprises determining whether the occupant is inside the vehicle based on information of a first neural network and a second neural network.

3. The method of claim 2, wherein the determining of whether the occupant is inside the vehicle based on information of the first neural network and the second neural network by performing operations comprising:

detecting a plurality of sounds in and around the vehicle;
recording the sounds into a plurality of audio files;
determining whether the sounds are originated from inside or outside of the vehicle based on information of the first neural network; and
classifying the sounds into a plurality of categories based on information of the second neural network.

4. The method of claim 3, wherein the detecting of the sounds in and around the vehicle comprises initiating the detecting of the sounds by turning off the vehicle or by pushing an engine stop button, a key not inserted in an ignition keyhole, and one or more doors of the vehicle being locked.

5. The method of claim 3, wherein the determining of whether the sounds are originated from inside or outside of the vehicle comprises machine learning of the audio files via the first neural network.

6. The method of claim 3, wherein the classifying of the sounds into the plurality of categories comprises machine learning of the audio files via the second neural network.

7. The method of claim 5, wherein the machine learning of the audio files via the first neural network comprises:
processing the audio files with a mel-frequency cepstrum algorithm by calculating a respective set of mel-frequency cepstrum coefficients for each of the audio files; and
processing the mel-frequency cepstrum coefficients by the first neural network to learn a set of characteristics of the respective audio file.

8. The method of claim 7, wherein the processing of the audio files comprises performing logarithmic and linear Fourier Transform of the audio files on a Mel scale.

9. The method of claim 5, wherein the machine learning of the audio files via the second neural network comprises:
processing the audio files with a mel-frequency cepstrum algorithm by calculating a respective set of mel-frequency cepstrum coefficients for each of the audio files; and
processing the mel-frequency cepstrum coefficients by the second neural network to learn a set of characteristics of the respective audio file.

10. The method of claim 9, wherein the processing of the audio files comprises performing logarithmic and linear Fourier Transform of the audio files on a Mel scale.

11. An apparatus implemented as an audio recognition system of a vehicle, comprising:
one or more microphones configured to detect a plurality of sounds;
one or more sensors configured to monitor one or more conditions of the vehicle;
a memory configured to store raw data of the sounds and a plurality of audio files recorded from the sounds;
a processor configured to perform operations comprising:
recording the sounds in the memory as the audio files;
processing the audio files with a mel-frequency cepstrum algorithm by calculating a respective set of mel-frequency cepstrum coefficients for each of the audio files;
receiving information of the one or more conditions of the vehicle from the sensors;
determining whether an occupant is inside the vehicle based on information of the first neural network and the second neural network such that the occupant is determined to be at risk of danger responsive to the audible files indicating that the occupant is inside the vehicle and the vehicle information indicating that doors of the vehicle are locked and a temperature inside the vehicle exceeds a threshold temperature;
determining whether the vehicle is at risk of theft or vandalism based on information of the one or more conditions of the vehicle and information of the first neural network and the second neural network such that the vehicle is determined to be at risk of theft responsive to the audible files indicating a sound from outside the vehicle and the vehicle information indicating that the vehicle is tilted or moved, the doors of the vehicle are locked with no occupant inside, and a key of the vehicle is not inside the vehicle; and
performing some or all actions of a plurality of actions upon determining that the occupant or the vehicle is at risk, the plurality of actions comprising:
wirelessly transmitting alert messages to a wireless receiver;
activating headlights of the vehicle to flash the headlights;
activating a horn of the vehicle to honk the horn; and
controlling locks on the doors to unlock the doors;
a first neural network comprising at least a first hidden layer with a first set of nodes; and
a second neural network comprising at least a second hidden layer with a second set of nodes.

12. The apparatus of claim 11, wherein, in processing of the audio files, the processor is configured to perform a logarithmic operation and a linear Fourier Transform of the audio files on a Mel scale.

13. The apparatus of claim 11, wherein the first neural network is configured to perform operations comprising:
processing the mel-frequency cepstrum coefficients to learn a set of characteristics of the respective audio file recorded from the sounds; and
determining whether the sounds are originated from inside or outside of the vehicle.

14. The apparatus of claim 11, wherein the second neural network is configured to perform operations comprising:
processing the mel-frequency cepstrum coefficients to learn a set of characteristics of the respective audio file recorded from the sounds; and
classifying the sounds into a plurality of categories.

15. The apparatus of claim 11, wherein the one or more conditions of the vehicle comprise one or more of:
a key being not inserted in an ignition keyhole;
a key being not inside the vehicle;
the vehicle being lifted;
the vehicle being in motion;
one or more doors of the vehicle being locked; and
a temperature inside the vehicle reaching or exceeding a threshold temperature.

16. The apparatus of claim 11, further comprising:
a communication device configured to convey a plurality of instructions to a plurality of components of the vehicle regarding the plurality of actions to be performed by the components,
wherein, in performing the some or all actions, the processor is configured to provide, via the communication device, one or more instructions to one or more components of the vehicle.

* * * * *